United States Patent [19]

Snyder

[11] Patent Number: 4,625,318
[45] Date of Patent: Nov. 25, 1986

[54] FREQUENCY MODULATED MESSAGE TRANSMISSION

[75] Inventor: Robert J. Snyder, Westford, Mass.
[73] Assignee: Wang Laboratories, Inc., Lowell, Mass.
[21] Appl. No.: 703,798
[22] Filed: Feb. 21, 1985
[51] Int. Cl.[4] .............................................. H04L 27/12
[52] U.S. Cl. ........................................ 375/46; 375/45; 375/48; 375/62; 375/66; 332/16 R; 331/179
[58] Field of Search ....................... 375/45, 46, 47, 48, 375/62, 64, 66; 332/16 R, 22; 331/45, 49, 179; 370/11; 455/102

[56] References Cited

U.S. PATENT DOCUMENTS

| | | | |
|---|---|---|---|
| 3,421,088 | 1/1969 | Salley et al. | 375/65 |
| 3,764,992 | 10/1973 | Milne | 331/49 |
| 3,803,354 | 4/1974 | Bennett | 375/65 |
| 4,213,094 | 7/1980 | Wood | 375/53 |

OTHER PUBLICATIONS

Vale, "SAW Quadraphase Code Generator", *IEEE Transactions on Microwave Theory & Techniques*, vol. MTT-29, No. 5, May 1981.
Zeimer et al, "Conversion and Matched Filter Approximations for SMSK", *IEEE Transactions on Communications*, vol. COM-30, No. 3, Mar. '82.
"Faster Digital Communications with Duobinary Techniques", *Electronics*, Mar. 22, 1963, Adam Lender.

*Primary Examiner*—Robert L. Griffin
*Assistant Examiner*—Raymond C. Glenny
*Attorney, Agent, or Firm*—Michael H. Shanahan; Kenneth L. Milik

[57] ABSTRACT

A data signal is encoded as frequency modulation by selecting carrier sources of different phases in response to data signals and filtering the resultant wave to produce an output deviating from the carrier frequency for one signal time in response to a single shift of phase. A phasing switch stores a record of the last sent phase and a record of the parity value of the number of zeros sent. The selected phase is as last sent for a 0, advanced for a 1 when the zero parity is of one value, and retarded when the zero parity is of another value.

4 Claims, 4 Drawing Figures

FREQUENCY MODULATED MESSAGE TRANSMISSION

BRIEF SUMMARY OF THE INVENTION

The invention relates to transmission of data over a transmission medium using frequency modulated encoding.

Encoding apparatus for encoding a stream of data having discrete signals occurring at a predetermined rate B as a corresponding frequency modulated wave features, according to the invention, a carrier source of n carrier waves (where n is an integer at least equal to three) all of the carrier waves being of a predetermined frequency f, the n waves being phased around a cycle at uniform phase increments. A phasing switch is connected to receive the n carrier waves from the carrier source and to receive the data stream. The phasing switch is constructed to select a particular one of the n carrier waves in response to each signal of the data stream and to emit for an interval 1/B the selected wave. Filter means is connected to receive the selected wave from the phasing switch and constructed to emit a filter output wave which in the absence of a change in the wave selected by the phasing switch is of frequency f, and which responsive to a change of the wave selected by the phasing switch deviates in frequency from f for a period 1/B.

The invention may additionally feature a phasing switch selecting in response to each data stream signal a carrier wave from the group consisting of the last selected wave, the wave of phase 1/n cycle advanced from the last selected wave, and the wave of phase 1/n cycle retarded from the last selected wave, and wherein the filter output wave in response to a change of the wave selected by the phasing switch deviates in frequency from f by an amount B/n. The phasing switch may advantageously include means for storing a signal representative of the carrier wave last selected and means for storing a signal representative of the parity value of the number of 0's previously received in the data stream of a message, and the phasing switch may select the same carrier wave as last selected in response to a 0 in the data stream, select that carrier wave with a phase one increment advanced from that last sent in response to a 1 in the data stream when the parity storing means has stored therein a signal of a predetermined value and select that carrier wave with a phase one increment retarded from that last sent in response to a 1 in the data stream when the parity storing means has stored therein a signal other than of the predetermined value.

A communications system according to the invention may additionally feature a receiving station, and a transmission medium connecting the sending and receiving stations, the receiving station including a demodulator connected to receive a received wave from the medium and in response thereto to emit a baseband signal corresponding to the frequency modulation on the received wave.

DETAILED DESCRIPTION OF THE INVENTION

Figure 1:
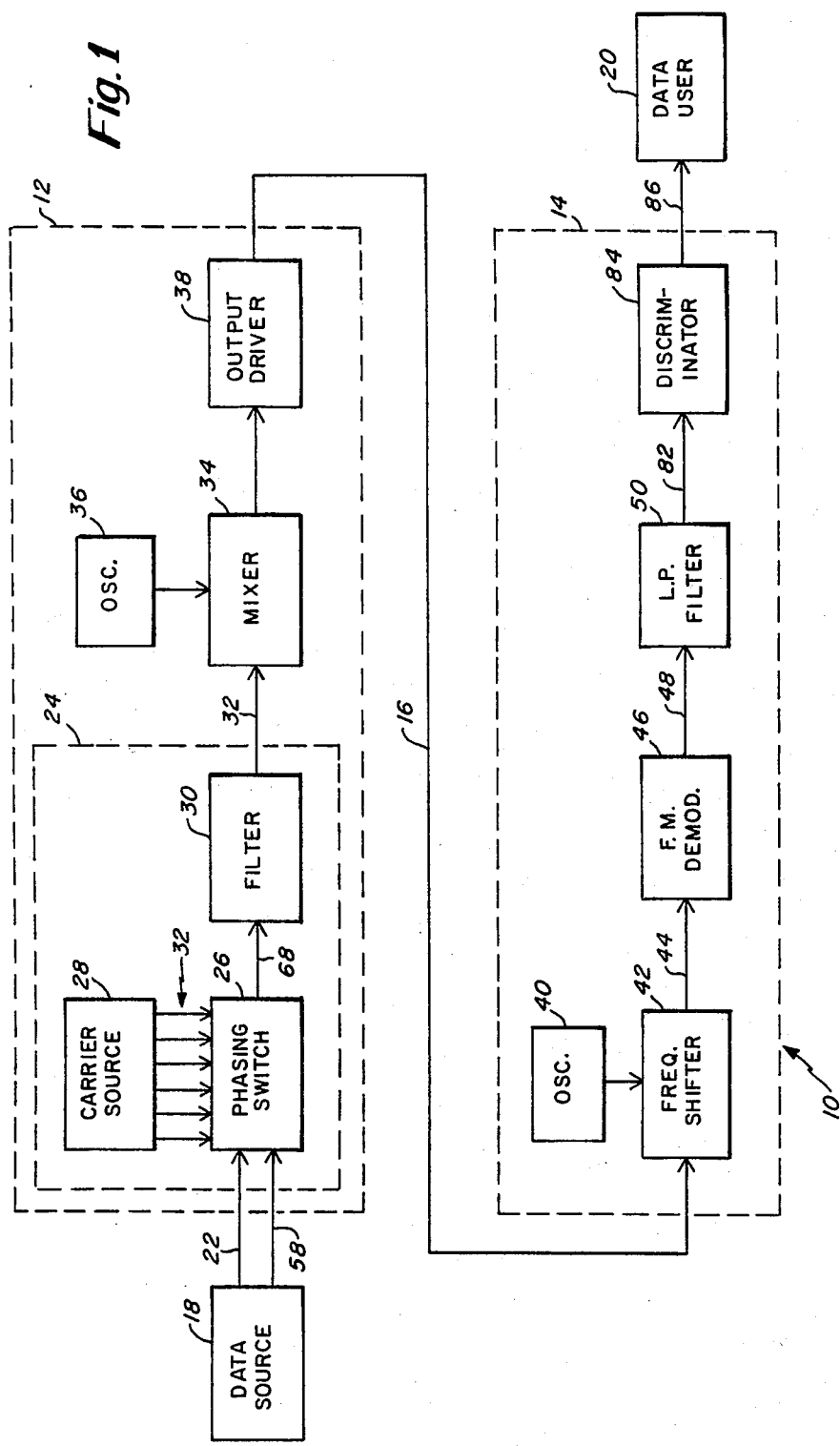
FIG. 1 shows a block diagram of a communication system employing the invention.

Referring to FIG. 1, communication system 10 includes sending station 12 and receiving station 14 connected by transmission medium 16. Communication system 10 effects transfer to data user 20 of a stream of data received from data source 18 on channel 22 as a stream of discrete signals occurring at a rate which will be in general designated B and for the exemplary embodiment is 10 Mbits per s.

Sending station 12 includes encoding apparatus 24 which receives the data stream on channel 22 and emits a correspondingly frequency modulated signal on channel 32 as will be explained in more detail hereafter. Mixer 34, oscillator 36, and output driver 38 provide means for shifting the frequency of the modulated signal on channel 32 to a desired band and emitting it on transmission medium 16. The technology for constructing apparatus for shifting frequencies and emitting them on transmission media is well known and needs no further explanation.

Receiving station 14 includes oscillator 40 and frequency shifter 42 which receive the modulated wave from transmission medium 16 and convert it to a convenient intermediate frequency on channel 44 in accordance with well known techniques. FM demodulator receives the modulated wave on channel 44 and in response thereto emits on channel 48 a baseband signal corresponding to the frequency modulation on the received wave. Low pass filter 50 eliminates unwanted high frequencies from the output of demodulator 46, and discriminator 84 receives its input from filter 50 on channel 82 and emits a data stream on channel 86 reproducing that originally entered on channel 22. The technology and operation of the components of receiving station 14 are conventional and well known for recovering a data stream from a frequency modulated wave and need no further explanation.

Encoding apparatus 24 includes carrier source 28, phasing switch 26, and filter means 30. Carrier source 28 delivers on channels 32 n sinusoidal waves all at frequency generally designated f, the n waves being phased around a cycle at uniform phase increments. The number n may be any integer three or greater. In the exemplary embodiment, source 28 is taken as delivering 6 waves which accordingly are spaced with 60 deg phase increments, all waves being at frequency 84 MHz. The technology for constructing sources such as source 28 is well known and needs no further explication.

Figure 2:
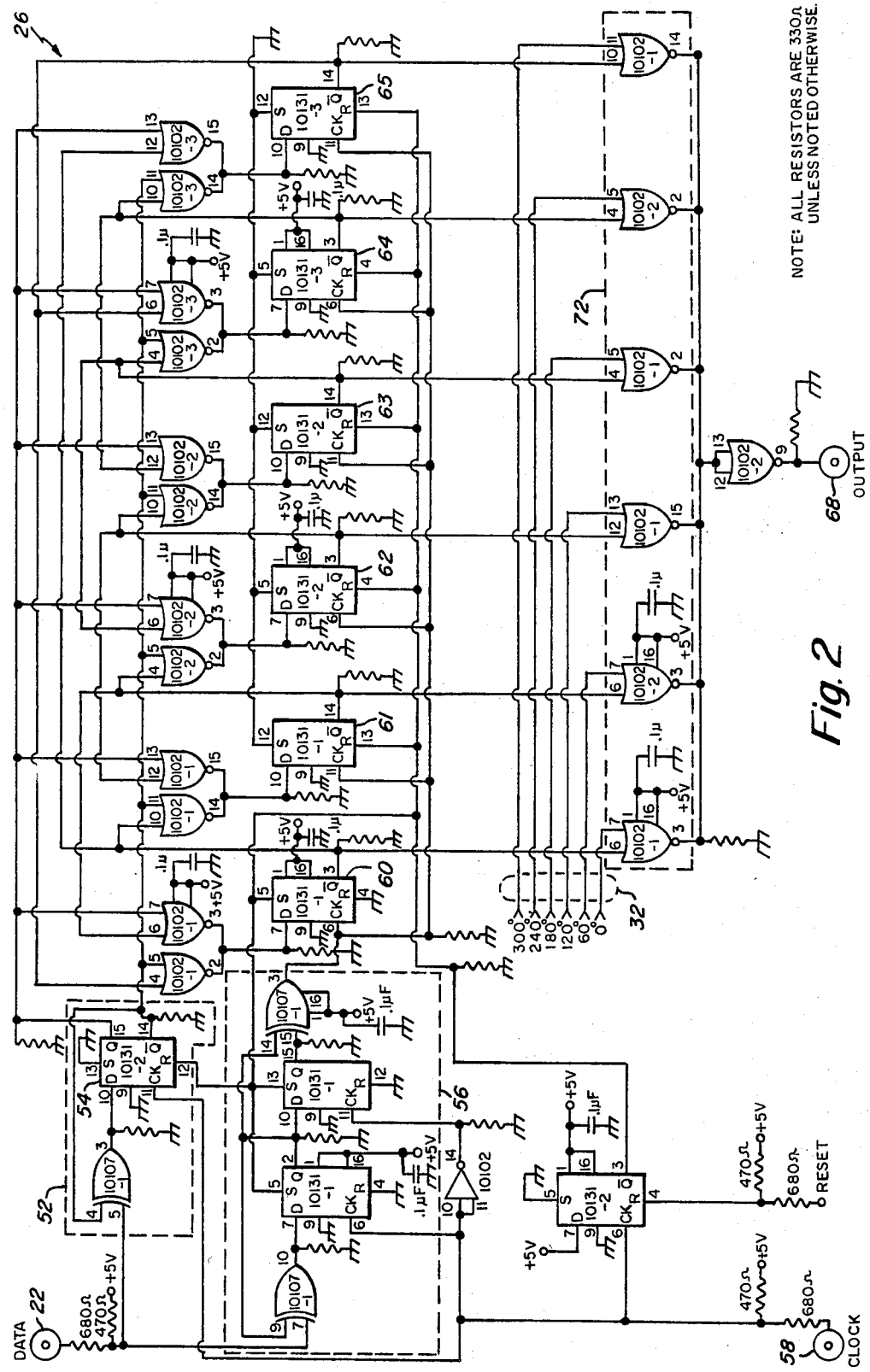
FIG. 2 shows a schematic diagram of the phasing switch shown in FIG. 1.

Phasing switch 26, shown in more detail in FIG. 2, receives the data signal from channel 22, a clock signal on channel 58 also from the data source, and on channel 32 the six progressively phased waves from source 28. The clock signal cycles at the data rate and presents a fall at the time of data signal shift. Zero parity circuitry 52 receives the input data stream and toggles zero parity flip-flop 54 each time a 0 appears in the data stream. Flip-flop 54 thus in its state stores a signal representing the parity value of the number of 0's that have arrived since it was initialized at the beginning of a message. Pulse-on-1 circuitry 56 also receives the input data stream and generates a rise whenever a 1 appears in the data stream. Six phasing control flip-flops 60–65 are interconnected by steering circuitry to form a cyclic shift register. Flip flop 60 is initialized with its output Q' as 0, while the flip-flops 61–65 are initialized with Q' as 1. Each time time a rise is generated by pulse-on-1 circuitry 56, the states of the six flip-flops are shifted to have the state with the 0 either advances or retards around the cycle. Whether the states advance or retard is controlled by the parity signal stored in zero parity flip-flop 54. The outputs of the phasing control flipflops control the switching by gates 72 of the several phased waves to channel 68, a 0 output on Q' of a particular flip-flop being effective in gating the corresponding wave onto the output channel. The phasing control flipflops thus by their states store a signal representing the last selected carrier wave switched to the output channel. The data stream is thus encoded into phase changes according to a duobinary system where a 0 is represented by no shift in the phase, and a 1 is represented by a unit shift either up of down depending on the parity value of the number of zeros previously sent. Filter 30 receives the switched phase output wave from phasing switch 26 and responds to it by emitting a frequency modulated wave. In general, this filter is a band pass filter designed to respond to an instantaneous change in phase of a wave of frequency f delivered to its input with an output wave with frequency which deviates from f for a period equal to the signal interval of the data steam, namely 1/B. When the wave delivered to the filter input is reselected at intervals of 1/B as one of (1) a wave the same as the last wave selected, (2) a wave advanced by 1/n cycle from the last wave selected, or (3) a wave retarded by 1/n cycle from the last wave selected, the filter output will correspondingly produce an output lasting for 1/B which is (1) undeviated from frequency f, (2) deviated downward from f by an amount B/n, or (3) deviated upward from f by an amount B/n. For the exemplary embodiment where f is 84 MHz, B is 10 Mbits/s, and n is 6, the attenuation function of a suitable filter is as follows.

Figure 3:
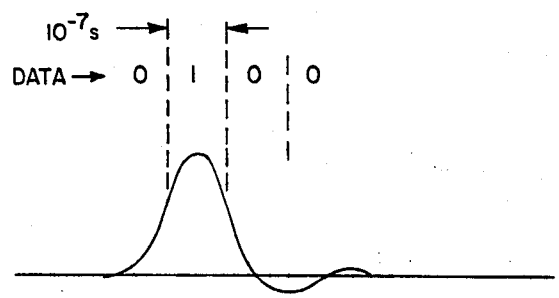
FIGS. 3 and 4 show wave forms generated by the system of FIG. 1.
Figure 4:
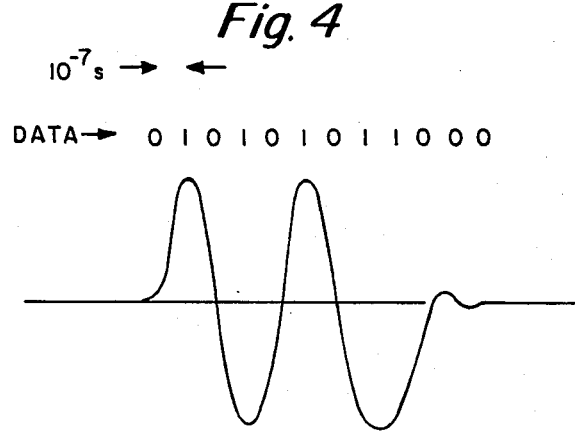

| df | atten |
|---|---|
| 0.0 | 0.0 |
| 0.5 | 0.0 |
| 1.0 | 0.0 |
| 1.5 | 0.3 |
| 2.0 | 0.6 |
| 2.5 | 0.8 |
| 3.0 | 1.1 |
| 3.5 | 1.7 |
| 4.0 | 2.5 |
| 4.5 | 3.2 |
| 5.0 | 4.4 |
| 5.5 | 5.9 |
| 6.0 | 7.7 |
| 6.5 | 9.7 |
| 7.0 | 12.2 |
| 7.5 | 15.2 |
| 8.0 | 19.0 |
| 8.5 | 24.1 |
| 9.0 | 30.3 |
| 9.5 | 39.0 |
| 10.0 | 51.6 | where df is the deviation from 84 MHz in MHz, and atten is the attenuation in DB. As mentioned above, the frequency modulated wave from filter 30 is frequency shifted in mixer 34 to some convenient band for transmission on a frequency multiplexed transmission medium and emitted on the medium 16. At the receiving station 14 the wave is received from the medium. It is convenient but not necessary to shift the frequency in frequency shifter 42 to an IF frequency which may be the same as that of carrier source 28 before demodulating. In any case FM demodulator 46 responds to the frequency modulated wave it receives on channel 44 and emits a baseband wave representative of the frequency modulation on the entering wave. Low pass filter passes this baseband wave while blocking high frequency components generated in the demodulator or elswhere. The wave shape emitted from filter 50 on channel 82 corresponding to a sequence of data . . . 0100 . . . is shown in FIG. 3, while that corresponding to a sequence . . . 010101011000 . . . is shown in FIG. 4. The doubinary nature of the encoding is clearly shown in FIG. 4, where the wave assumes both positive and negative values corresponding to data signals of 1 depending on the parity value of the number of zeros previously sent. As mentioned previously, the construction of discriminator 84 to decode the wave on channel 82 to recover the original data stream is well known.

Many modifications of the embodiment here described will be evident to those skilled in the art and are within the scope of my invention.

I claim:

1. Encoding apparatus for encoding a stream of data having discrete signals occurring at a predetermined rate B, as a corresponding frequency modulated wave, comprising a carrier source simultaneously generating n sinusoidal carrier waves (where n is an integer at least equal to three) all of said carrier waves being of a predetermined frequency f, said n waves having relative phases phased around a cycle at uniform phase increments, a phasing switch connected to receive the n carrier waves from said carrier source and to receive said data steam, said phasing switch being constructed to select sequentially particular ones of said carrier waves and to emit each selected wave only for an interval 1/B, said switch being responsive to data in said stream to select a one of said carrier waves which is shifted in phase from the carrier wave selected immediately previously by an amount independent of the phase of the wave selected immediately previously, filter means connected to receive each selected wave from said phasing switch and constructed to emit, upon receiving a selected carrier wave of the same phase as that of the previously received carrier wave, a filter output wave which is of frequency f, and to emit upon receiving a selected carrier wave shifted in phase from the carrier wave last previously received a filter output wave which deviates in frequency from f for a period 1/B, wherein said phasing switch selects in response to each increment of data in said data stream a carrier wave from a group consisting of the last selected carrier wave, the carrier wave of phase 1/n cycle advanced from the last selected carrier wave, and the carrier wave of phase 1/n cycle retarded from the last selected carrier wave, and wherein said filter responds to a change in which carrier wave is selected by said phasing switch by emitting a wave deviating in frequency from f by an amount B/n.

2. Apparatus as in claim 1, said phasing switch including last selected phase storing means for storing a signal representative of the last selected carrier wave and parity storing means for storing a signal representative of the parity value of the number of 0's previously received in the data stream of a message, and wherein said phasing switch is constructed to

- select that carrier wave last selected in response to a 0 in said data stream,
- select that carrier wave with a phase one increment advanced from that last selected in response to a 1 in said data stream when said parity storing means has stored therein a signal of a predetermined value,
- select that carrier wave with a phase one increment retarded from that last selected in response to a 1 in said data stream when said parity storing means has stored therein a signal other than of said predetermined value.

3. A communications system including a sending station, a receiving station, and a transmission medium connecting said sending and receiving stations, said sending station including encoding apparatus as in claim 1 and means for emitting said filter output wave on said medium, said receiving station including a demodulator connected to receive a received wave from said medium and in response thereto to emit a baseband wave with amplitude proportional to frequency of the received wave.

4. Encoding apparatus for encoding a stream of data having discrete signals occurring at a predetermined rate B, as a corresponding frequency modulated wave, comprising

- a carrier source simultaneously generating n sinusoidal carrier waves (where n is an integer at least equal to three) all of said carrier waves being of a predetermined frequency f, said n waves having relative phases phased around a cycle at uniform phase increments,
- a phasing switch connected to receive the n carrier waves from said carrier source and to receive said data stream, said phasing switch being constructed to select sequentially particular ones of said carrier waves and to emit each selected wave for an interval 1/B, said switch being responsive to data in said stream to select a one of carrier waves which is shifted in phase from the carrier wave selected immediately previously by an amount independent of the phase of the wave selected immediately previously,
- filter means connected to receive each selected wave from said phasing switch and constructed to emit, upon receiving a selected carrier wave of the same phase as that of the previously received carrier wave, a filter output wave which is of frequency f, and to emit upon receiving a selected carrier wave shifted in phase from the carrier wave last previously received, a filter output wave which deviates in frequency from f for a period 1/B.

* * * * *